Dec. 28, 1943.    P. A. PRICE    2,337,854
EDGER SAW COLLAR
Filed July 2, 1942
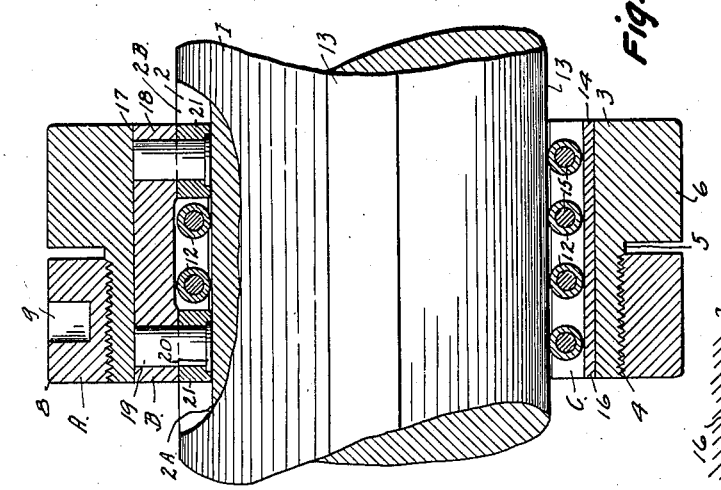
Fig. 2.
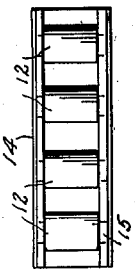
Fig. 4.
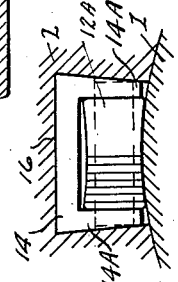
Fig. 6.
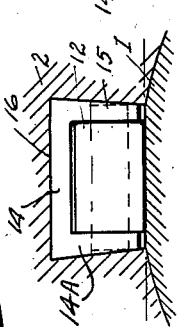
Fig. 5.
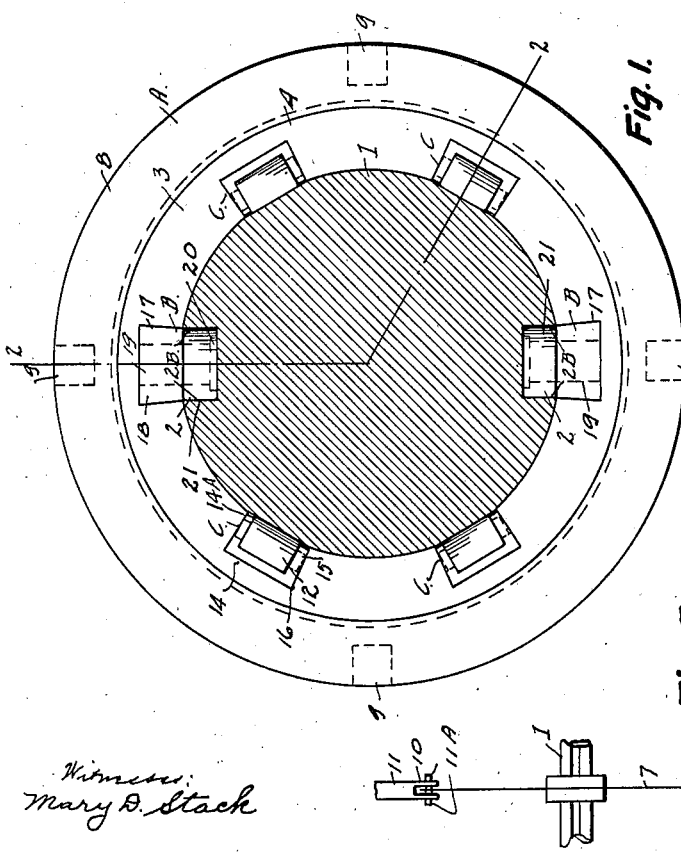
Fig. 1.
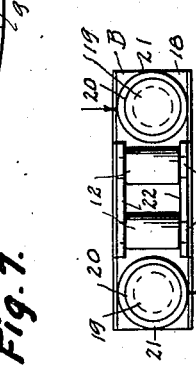
Fig. 3.
Fig. 7.
Witness:
Mary D. Stack
Percy A. Price
Inventor
Emmett E. Stark
Attorney Patented Dec. 28, 1943

2,337,854

UNITED STATES PATENT OFFICE 2,337,854

EDGER SAW COLLAR

Percy A. Price, Marshfield, Oreg.

Application July 2, 1942, Serial No. 449,532

1 Claim. (Cl. 143—155)

My invention relates to edger saw collars and has for its prime objective an easier moving collar. Other objectives follow as the result of an easier moving collar as will become apparent from the minute description of my invention.

How this prime objective has been accomplished is shown in the accompanying drawing in which Fig. 1, is an end view of my collar; Fig. 2, is a section on the line 2—2 of Fig. 1; Fig. 3, is a bottom view of the guide roll assembly B; Fig. 4, is a bottom view of the supporting roll assembly C; Fig. 5, is an enlarged end view of the supporting roll assembly C; Fig. 6, is an enlarged end view of a supporting roll assembly C showing the employment of concave rolls—both solid and sectional, and Fig. 7, is a diagrammatic view of an edger saw mounting and shifting means.

Thruout the drawing and the specification similar numerals refer to similar parts.

Those familiar with the manufacture of lumber know that a board is formed with parallel sides thru the agency of edger saws, and that these saws, which are circular, are mounted on collars which are movable longitudinally on the edger arbor whereby said saws may be spaced and held to a predetermined distance apart to rip a board to a desired width.

In the manufacture of pine, the logs are seldom over sixteen feet in length and hence what are known as long or Eastern type edger saw shifters are employed thereby providing adequate leverage to effect the shifting of the saws.

On the Pacific Coast where fir is produced the logs are long—sometimes up to 100 feet—which fact eliminates the employment of the Eastern type of shifter and causes the employment of the short or stub type.

Neither type has been illustrated since they vary much in design and are well known to those to whom this invention is addressed. These same men know that mainly strength and awkwardness effect the shifting of the edger saws with the short type of shifters when these are not power driven. Power driven shifters are complicated and costly and are a source of trouble. It is therefore one of my objectives to eliminate this costly, troublesome mechanism and at the same time not require any great increase in the manual effort required of the edgerman.

It has been repeatedly noted, especially toward the end of the day, that the edgerman is prone to leave the saws spaced as is for some length of time rather than shift them for each board or cant to obtain the widest possible width. As a consequence of the above, much valuable lumber is wasted. It follows that the elimination of waste is another objective of my invention.

How I accomplish my objectives will now be described in detail.

As is well known, the edger comprises a driven arbor 1 provided with diametrically opposed keyways 2 in which are disposed keys (not illustrated) secured in the body 3 of the collar A in lieu of the guide roll assemblies B of the present invention. The collar body 3 is formed with a threaded portion 4 terminating in a shoulder 5 formed adjacent the outstanding portion 6. The eye of the saw 7 fits over and rides upon the shoulder 5 and the saw is clamped against the outstanding portion 6 by the nut 8 mounted on the threaded portion 4 and tightened thru the agency of a spanner wrench, not shown, for which the holes 9 are provided. The periphery of the saw 7 is positioned between the forked portions 10 of the shifter 11, the guide pins 11A of which contact the sides of the revolving saw when the same is being moved longitudinally on the arbor 1. See Fig. 7.

When it is considered that these saws are from 32 to 42 inches in diameter and the collars from 3 to 4 inches wide it is apparent that the collars will nip the arbor and the keys dig in thereby making it difficult to move the collar longitudinally on the arbor. As the arbor wears down and the bore of the collar increases this difficulty increases. It is also apparent that when the collar is loose upon the arbor it is difficult to hold in line to make straight lumber. To be able to make straight lumber is another objective.

In Fig. 6, I have illustrated the use of concave supporting rolls designated as 12A. These concave rolls may be made as one solid roll as indicated on the right hand side, or they may be made up of a number of thin sections as indicated upon the left hand side of the roll in Fig. 6. It is evident that a one point contact causes rapid wear of both the arbor and the rolls. This life may be increased in the concave roll assembly by relieving the center of the roll (not shown but apparent from a perusal of Fig. 6) and thus permitting the roll to ride on each end where the diameters are equal. It is apparent that if the concave roll contacted the arbor thruout there would be a tendency for the roll to drag since the ends would tend to travel faster than the center. To eliminate this drag in the concave roll as much as possible the roll may be made up of thin sections as shown and described. The advantage in the concave roll is the elimination of labor in milling the flat tracks 13, four of which are shown on the arbor 1 to form a bearing surface for the flat rolls 12, the use of which is illustrated in Figs. 1, 2, 3, 4, and 5. These flat rolls 12 may be made of adequate length without causing drag on the side friction incident to the use of sectional rolls of the concave type. In Figs. 1 and 5, the width of the track 13 corresponds to the width of the channel 14 in which the rolls 12 are positioned. The forming of this track 13 does not cut down the strength of the arbor 1 very much, in fact any loss of strength is more than made up in the relieving of the strains incident to the cutting of the keyways 2 in said arbor.

The supporting rolls 12 are preferably case-hardened and ground to provide contact with the tracks 13 when the collar is upon the arbor. They are shown loosely mounted upon the pins 15 which are supported in the legs 14A of the roll channel 14. The outer sides of the legs 14A and the top of said channel 14 are formed to tightly fit the dove-tail keyway 16 in the collar A. The channel 14 may be secured against longitudinal movement in its keyway 16 by spot welding or in any other suitable manner.

In Figs. 1, 2, and 3, a similar dove-tail keyway 17 is formed for the reception of the supporting structure 18 of the guide roll assembly B. In each end of this supporting structure 18 is shown a press-fitted pin 19 provided with a head 20 to support the guide roll 21 rotatable about the pin 19. These rolls extend into the keyways 2 and are made of a diameter slightly less than the width of said keyways. In action the rolls are free to bear against but one of a keyway. The rolls 21, positioned as they are, eliminate the digging in action common with the straight key used in current practice. Between the guide rolls 21 are positioned two supporting rolls 12 which are rotatable on the pins 15 supported in the legs 22 depending from the supporting structure 18 in such a manner as to form a snug sliding fit between the walls 2B of the keyway 2. These legs 22 thus serve with the guide rolls 21 to transmit the force from the revolving arbor to the saw. Although none is shown, a spreader may be formed between the two rolls 12 and the sides or legs 22 to keep said legs 22 apart under any abnormal pressure.

It is apparent that additional keyways 2 may be provided in lieu of the tracks 13 and the supporting roll assemblies C be made to permit their rolls to ride upon the bottom of said keyways similar to the way the rolls 12 of the guide roll assemblies B do.

Both assemblies B and C are made up in units and readily assembled in the collar prepared to receive them.

Many modifications may be made in adapting my invention to the many makes and sizes of edgers now in use without departing from the basic idea of my invention, therefore I do not limit said invention to the exact structure shown and described but extend it to all that comes fairly within the scope of the appended claim.

What I claim as new over the prior art is:

An edger saw collar adapted to be moved longitudinally upon an arbor provided with a plurality of keyways and tracks, said collar having a plurality of keyways circumferentially arranged in the bore of the collar, channelled members in said keyways, rolls mounted in the channelled members to engage the bottom of said arbor keyways and the tracks for support of the collar during longitudinal movement thereof along said arbor, and rolls to engage the sides of said arbor keyways to cause the collar to rotate with the arbor.

PERCY A. PRICE.